(12) United States Patent
Le Strat

(10) Patent No.: US 11,660,628 B2
(45) Date of Patent: May 30, 2023

(54) METHOD FOR APPLYING A COATING PRODUCT ACCORDING TO THE DROP ON DEMAND TECHNOLOGY AND ROBOT APPLICATOR FOR CARRYING OUT THE METHOD

(71) Applicant: EXEL INDUSTRIES, Épernay (FR)

(72) Inventor: Cédric Le Strat, Paris (FR)

(73) Assignee: EXEL INDUSTRIES, Epernay (FR)

(*) Notice: Subject to any disclaimer, the term of this patent is extended or adjusted under 35 U.S.C. 154(b) by 299 days.

(21) Appl. No.: 16/658,002

(22) Filed: Oct. 18, 2019

(65) Prior Publication Data

US 2020/0130004 A1  Apr. 30, 2020

(30) Foreign Application Priority Data

Oct. 24, 2018  (FR) ........................... 1859829

(51) Int. Cl.
*B05B 12/04* (2006.01)
*B05B 12/12* (2006.01)
(Continued)

(52) U.S. Cl.
CPC ......... *B05B 13/0452* (2013.01); *B05B 12/04* (2013.01); *B05B 12/12* (2013.01); *B05B 13/0431* (2013.01); *B41J 3/4073* (2013.01)

(58) Field of Classification Search
CPC . B05B 13/0431; B05B 13/0452; B05B 12/00; B05B 12/02; B05B 12/04;
(Continued)

(56) References Cited

U.S. PATENT DOCUMENTS 4,928,111 A * 5/1990 Walton ................... G01D 15/18
347/54
2005/0122381 A1* 6/2005 Golombat .................. B41J 2/09
347/77
(Continued)

FOREIGN PATENT DOCUMENTS

CN  1622882 A  6/2005
CN  1790114 A  6/2006
(Continued)

OTHER PUBLICATIONS

INPI Rapport de Recherche Préliminaire for Patent Application No. FR1859829, dated Jun. 12, 2019, 2 pp.

*Primary Examiner* — Alexander M Weddle
(74) *Attorney, Agent, or Firm* — Soquel Group LLC

(57) ABSTRACT

A method for applying a coating product using the drop on demand technology, wherein the coating product is deposited by a robot applicator including a controller and at least one nozzle with sequential opening, commanded by the controller, the method including moving the nozzle of the robot applicator between a starting point and an arrival point, the projections of which, along the ejection axis of the nozzle, on the surface to be coated, define first and second reference points respectively belonging to two edges of the surface to be coated, in order to deposit a series of drops between the two edges, the spacing between the respective centers of two successive drops being adjusted by the controller as a function of the length of the journey between the two reference points and such that the last drop is deposited in a centered manner on the second reference point.

10 Claims, 6 Drawing Sheets

(51) Int. Cl.
*B05B 13/04* (2006.01)
*B41J 3/407* (2006.01)

(58) Field of Classification Search
CPC ...... B05B 12/084; B05B 12/12; B41J 3/4073; B25J 11/0075
See application file for complete search history.

(56) References Cited

U.S. PATENT DOCUMENTS

| | | | |
|---|---|---|---|
| 2005/0151784 A1* | 7/2005 | Padgett | B41J 2/145 347/40 |
| 2015/0086723 A1 | 3/2015 | Büstgens | |
| 2017/0252765 A1* | 9/2017 | Medard | B05B 12/04 |
| 2017/0252808 A1* | 9/2017 | Myerberg | B33Y 10/00 |
| 2021/0170763 A1* | 6/2021 | Büstgens | G06K 15/107 |

FOREIGN PATENT DOCUMENTS

| | | | | |
|---|---|---|---|---|
| CN | 1822323 A | 8/2006 | | |
| CN | 107089060 A | 8/2017 | | |
| CN | 107554076 A | 1/2018 | | |
| CN | 112912253 A | 6/2021 | | |
| EP | 3067215 A1 * | 9/2016 | ............ | B41M 3/001 |
| FR | 3048368 A1 | 9/2017 | | |
| JP | 2013193334 A | 9/2013 | | |
| WO | WO-2013103298 A1 * | 7/2013 | ............... | B05B 1/08 |
| WO | 2013139326 A1 | 9/2013 | | |
| WO | 2018108565 A1 | 6/2018 | | |
| WO | WO-2019201367 A1 * | 10/2019 | ......... | B05B 13/0452 |
| WO | WO-2020198038 A1 * | 10/2020 | ............... | B22F 10/22 |

* cited by examiner

METHOD FOR APPLYING A COATING PRODUCT ACCORDING TO THE DROP ON DEMAND TECHNOLOGY AND ROBOT APPLICATOR FOR CARRYING OUT THE METHOD

CROSS-REFERENCE TO RELATED APPLICATION

This application claims priority of French Patent Application No. 18 59829, filed on Oct. 24, 2018.

FIELD OF THE INVENTION

The present invention relates to a method for applying a coating product according to the drop on demand technology, as well as a robot applicator for carrying out the method.

BACKGROUND OF THE INVENTION

The drop on demand (DOD) technology consists of depositing a coating product in drop form, which has the advantage of depositing only the quantity of product necessary to coat the surface.

Currently, when one wishes to coat a surface, for example with paint, one first delimits the contours of the surface. With an applicator device provided with at least one nozzle, in practice, several passes are made in the same direction, for example in the length direction of the part, but in an offset manner in order to cover the entire width of the surface to be coated. In other words, strips are applied adjacent to one another. Such a method is for example known from publication FR 3,048,368 A1, the content of which is incorporated herein by reference.

During the movement of the applicator, the frequency at which the drops are deposited one after the other is adjusted relative to the movement speed so as to deposit the drops in an adjacent manner, and therefore to form what is called a series of drops. Thus, the distance between two successive drops, or "inter-drop" distance, which is measured from center to center, is less than or equal to the diameter of a deposited drop. In other words, there may be overlap between two successive drops.

The problem with this type of method is that when the width of the surface to be painted is not a multiple of the inter-drop distance, it is then impossible to obtain a clean edge if the (adjacent) strips do not all have the same width. Certain parts of the surface may therefore remain bare, that is to say, they are not covered with paint (or the like). Typically, FIG. 3, which shows the result that can be obtained with a method of the prior art, shows that it is impossible to obtain a clean edge for a triangular surface, for example. Indeed, in this case, the series of drops never stop in the same location, that is to say that the last drop of the series of drops is never positioned in the same place on the movement axis of the nozzle, which yields a completely irregular edge, whereas it should be straight.

SUMMARY OF THE INVENTION

The invention more particularly aims to resolve these drawbacks by proposing a new method for applying paint (still using the drop on demand technology), owing to which it is possible to obtain a clean edge (in the direction of the width) even in parts of variable width and owing to which one is certain to cover the entire defined surface.

To that end, the invention relates to a method for applying a coating product, in particular paint, using the drop on demand technology, in which the coating product is deposited by a robot applicator comprising a controller and at least one nozzle with sequential opening, commanded by the controller. The method comprises:

a) calculating, in a coordinate system, the coordinates of several points located on the contour of a surface to be coated;

b) sending the coordinates of the points calculated in step a) to the controller of the robot (68); and c) moving the nozzle of the robot applicator between a starting point and an arrival point, the projections of which, along the ejection axis of the nozzle, on the surface to be coated, respectively define a first reference point and a second reference point respectively belonging to two edges of the surface to be coated, in order to deposit a series of drops between the two edges.

According to the invention, in step c), the spacing between the respective centers of two successive drops of the series of drops is adjusted by the controller as a function of the length of the journey between the two reference points and such that the last drop of the series of drops is deposited in a centered manner on the second reference point.

Owing to the invention, the position of the last drop deposited by the nozzle on its path is precisely mastered. In particular, the method according to the invention makes it possible to deposit the last drop in a manner centered on a reference point. One undeniable advantage of the invention is therefore that it is possible to paint a surface with a perfectly straight edge, even if the width of the surface to be painted, measured parallel to a movement axis of the nozzle, varies in the direction of the length and/or does not correspond to a multiple of the inter-drop distance.

According to advantageous, but optional aspects of the invention, such a process may include one or more of the following features, considered in any technically allowable combination:

- Said two successive drops are the same first two drops or the last two drops of the series of drops, and therefore the spacing between the respective centers of two successive drops of the series of drops is not the same over the entire length of the series of drops.
- Alternatively, said two successive drops are not the first two drops or the last two drops of the series of drops.
- In step c), the spacing between the respective centers of several pairs of two successive drops of the series of drops is adjusted and wherein said pairs of two successive drops are spaced apart at regular intervals from one another.
- At least two successive drops from the series of drops are spaced apart by a width, measured from center to center and parallel to the curvature of said journey, that is, by default, less than or equal to the width of a drop once spread.
- In step c), the spacing is adjusted between the respective centers of each pair of two successive drops of the series of drops, and therefore the spacing between the respective centers of two successive drops of the series of drops is substantially the same over the entire length of the series of drops.
- The spacing between the respective centers of the two successive drops is adjusted by modifying the opening frequency of the nozzle or the speed of the nozzle during its movement in step c).
- The spacing between the respective centers of the two successive drops is adjusted by modifying the opening frequency of the nozzle in real time based on the actual speed and/or position of the nozzle.

The first drop of the series of drops is centered on the first reference point.

The opening and closing of each nozzle is commanded electronically by solenoid valves.

The opening and closing of each nozzle is commanded electronically by piezoelectric actuators.

The robot comprises several nozzles, and the opening and closing of each nozzle is commanded electronically, independently for each nozzle, such that each nozzle can have a different ejection frequency.

The journey between the two reference points has, at all points, a curve radius identical to that of the path of the nozzle between the starting point and the arrival point.

The nozzle is oriented such that the spray axis of the nozzle remains substantially perpendicular to the surface to be coated over all of the movement between the starting point and the arrival point.

The invention also relates to a paint applicator robot, comprising a controller programmed to implement the steps of the method previously defined.

Lastly, the invention relates to an installation comprising one or several robots of this type.

BRIEF DESCRIPTION OF THE DRAWINGS

The invention and other advantages thereof will be better understood in light of the following description of several embodiments of the method according to the invention, provided solely as an example and done in reference to the appended drawings, in which.

DETAILED DESCRIPTION

In FIGS. 3-7, the deposited drops are shown by squares and not by circles for simplification reasons.

Figure 1:
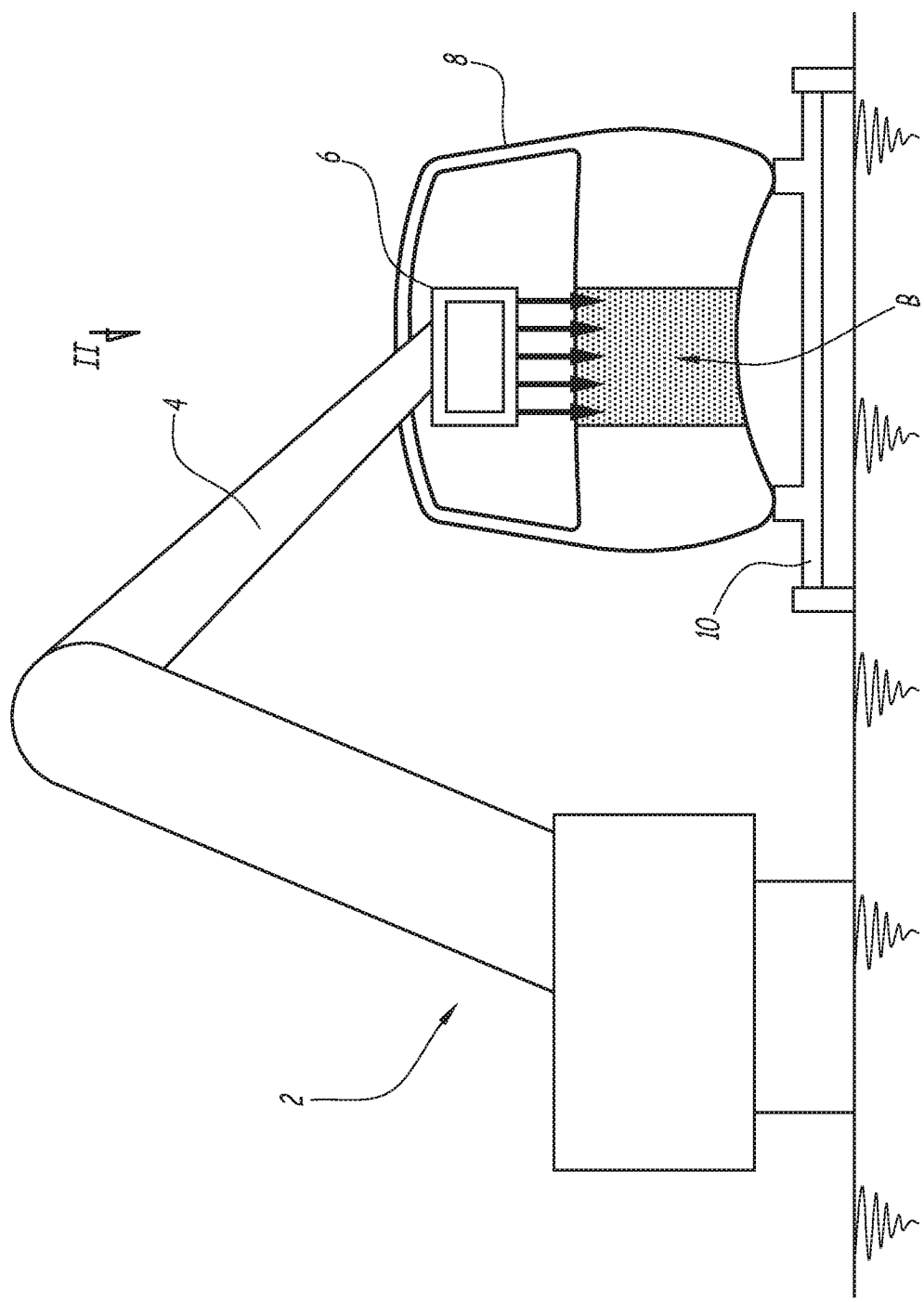
FIG. 1 is a schematic view of a paint applicator robot capable of implementing a method according to the invention.

FIG. 1 shows a multiaxial robot 2 comprising a moving arm 4 at the end of which a coating product applicator 6 is mounted. In the considered field, namely that of coating, this is called an applicator robot.

In practice, this robot is part of an installation (not shown) including one or several robots of this type. For example, the installation may comprise a first group of robots for applying a primer, a second group of robots for applying a layer of paint and a third group of robots for applying a protective varnish.

Preferably, the coating product in question is paint, but it may also be a primer, ink or varnish.

For example, the multiaxial robot 2 is shown in FIG. 1 alongside a conveyor 10 moving motor vehicle bodies 8. Consequently, the multiaxial robot 2 applies a stripe of paint B on the surface of the hood of each body 8 moved by the conveyor 10.

In the case of an installation comprising several robots, in practice the robots are arranged one after the other along the conveyor and/or on either side of the conveyor 10 transporting the parts to be coated, such as automobile bodies 8.

The coating product applicator 6 comprises at least one nozzle for the ejection of pain drops.

Figure 2:
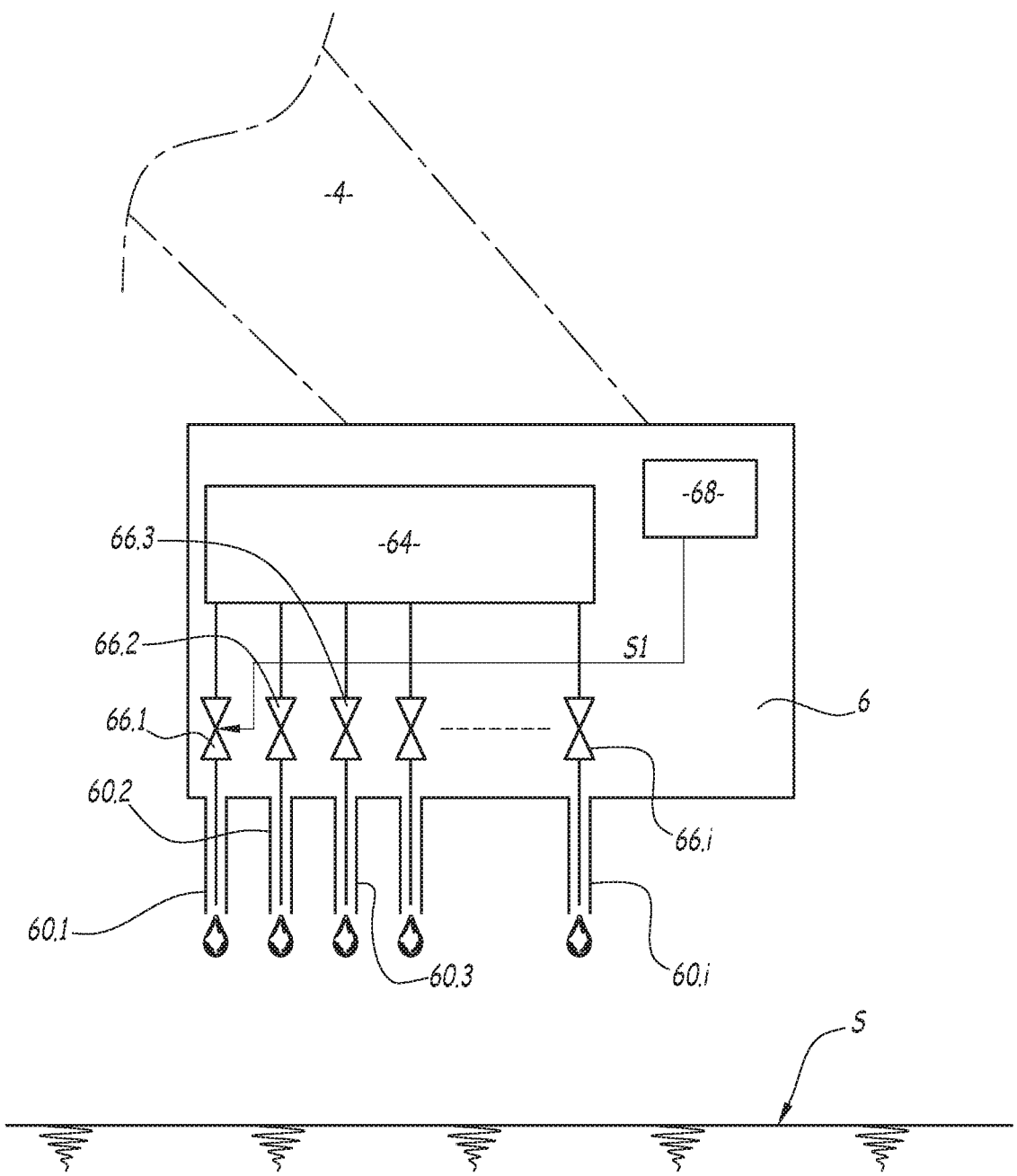
FIG. 2 is an enlarged view, still schematic, of a paint applicator device mounted at the end of a robot arm.

In the example, the coating product applicator 6 comprises a row of nozzles, referenced 60.1-60.*i* in FIG. 2, i being the number of nozzles in the row, which is for example between 10 and 100.

Here, the nozzles 60.1-60.*i* in the row are positioned perpendicular to the movement direction of the applicator 6 during the application of the coating product. Nevertheless, in a variant, the method could very well be implemented with an applicator whose nozzles are not aligned, or at least not in a direction perpendicular to the movement direction.

Each nozzle is configured to deposit the coating product dropwise. This is the drop on demand (DOD) technology.

Once deposited, a drop spreads on the surface to be coated. A spreading coefficient is defined as the ratio between the area of the surface that is coated once the drop has spread and the diameter of the drop. This spreading coefficient in particular depends on the type of coating product used. It is comprised between 5 and 10, often about 7.

In the example, each drop has a round shape once spread. However, for other colors, it is also possible to have drops that have a rectangle, ellipse or other shape once spread. This in particular depends on the viscosity, surface tension values, etc. of the coating product.

Advantageously, the nozzles 60.1-60.*i* are holes formed in a plate, the width of the drops then corresponding to the width of the holes.

In the embodiment of the figures, the applicator 6 comprises a valve for each nozzle of the row. The valves are respectively referenced 66.1-66.*i*. Each valve is connected to a reservoir 64 of coating product, which is shared by all of the valves when the applicator includes, like in the embodiment of the figures, several nozzles.

Here, each valve is an electromagnetic valve (or solenoid valve). Electromagnetic valves are well known in themselves, which is why they are not described in more detail. The principle is that the valve comprises a closing member, of the gate type, made from a ferromagnetic material, which therefore reacts when a magnetic field is applied. It is thus possible to move the gate simply by supplying a coil.

In a variant, other types of valves can of course be used. Examples in particular include piezoelectric valves, valves commanded with a different excitation signal, of the thermal, acoustic or pneumatic type.

Here, the reservoir 64 has an overpressure relative to the atmospheric pressure, such that the product is automatically ejected when a valve is opened.

Preferably, the applicator 6 further comprises a controller, or electronic control unit 68. The controller 68 controls the opening and closing of each valve, and therefore the opening frequency of each valve. Reference is made to sequential opening (or closing) nozzles. Consequently, the opening frequency of a valve corresponds to the frequency at which the drops are ejected from the nozzle, that is to say, the ejection frequency of the nozzle.

Advantageously, and in the case where the applicator robot comprises several nozzles, the opening and closing of each nozzle is commanded electronically, independently for each nozzle, such that each nozzle can have a different ejection frequency.

Typically, the controller 68 sends each valve a command signal, such as the electric signal S1 sent to the valve 66.1. Based on the received signal, the valve opens or closes by actuating the solenoid.

Consequently, the robot 2 preferably comprises another control member (not shown) for controlling the movements of the arm 4 so as to follow a setpoint path. Advantageously, the path control and valve control functions are pooled, that is to say, processed by a same control member, namely the controller 68.

Hereinafter, it is described how the coating product is deposited on a surface to be coated, that is to say, the steps of the application method. As will appear hereinafter, the robot 2 is configured to implement the application method. In particular, the controller 68 is programmed to command the implementation of the application method by the applicator 6.

During a first step a), several points located on the contour of the surface to be painted S are calculated in a coordinate system. Typically, the coordinates of the points located on the contour of the surface to be painted, S, can be calculated and/or recorded beforehand in a computer file.

Knowing the 3D envelope of the part to be coated, as well as the limits of each area to be treated, one deduces the coordinates of the points located on the contour of the surface to be painted.

The path of the robot is defined, in general by off-line programming, then sent by computer to the controller of the robot. The length developed by each path on impact is sent to the controller of the nozzles.

Indifferently, the method can be implemented irrespective of the nature of the path of the robot, that is to say, the path can be in one dimension (straight), two dimensions (curved path contained in a plane) or three dimensions.

Next, and during a second step b), the coordinates of the points calculated in step a) are sent (by computer) to the controller of the robot. In the example where these coordinates are recorded in a file, the file will quite simply be sent to the controller 68 by computer.

Figure 4:
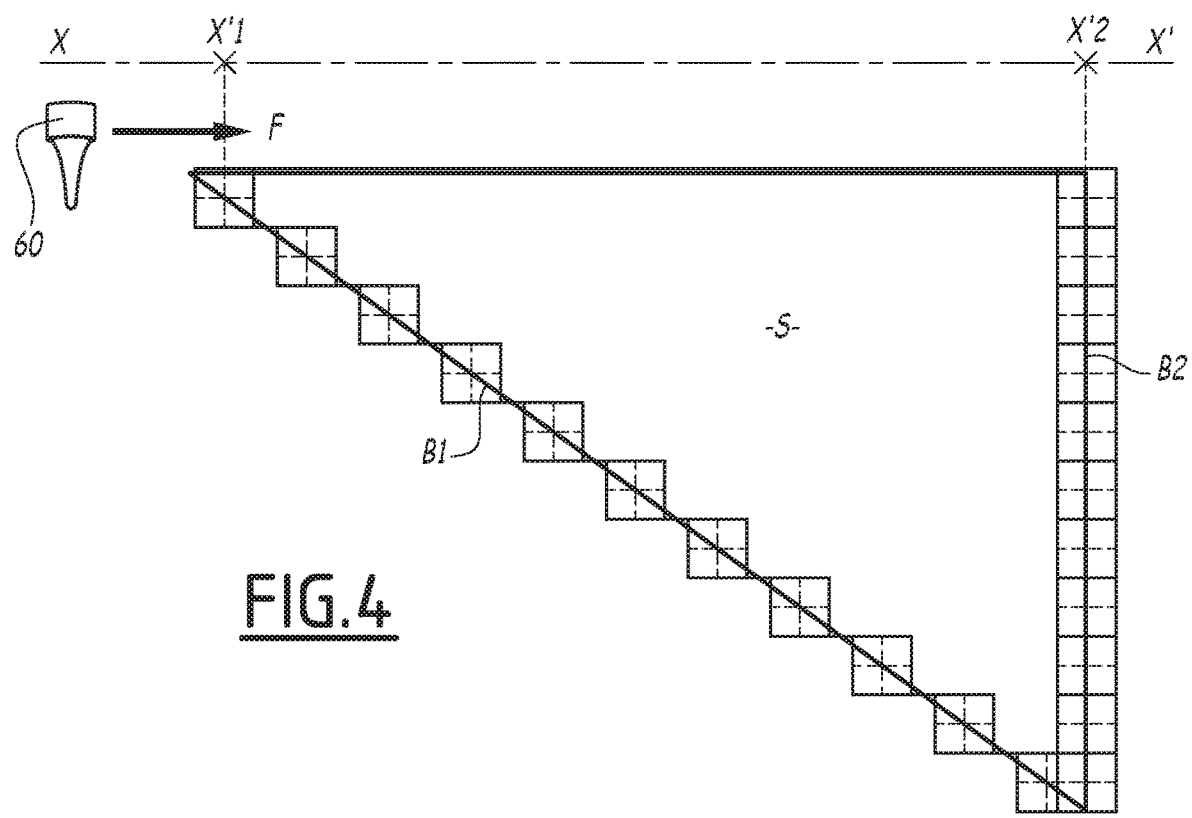
FIG. 4 is a view comparable to that of FIG. 3, but using the method according to the invention.

Once these steps are completed beforehand, it is possible to begin the application of the paint (or any other coating product) on the surface to be coated S. In the example of FIG. 4, the surface S is flat and triangular, specifically in the shape of a right-angled triangle. An axis X-X' is defined as the movement axis of the coating product applicator 6. The applicator 6 is therefore, in the example, moved in translation along the movement axis s.

Therefore, it is considered here that the applicator 6 comprises a single nozzle 60, and will therefore perform several passes in the direction X-X', to cover the entire area of the surface S. Specifically, in the example of FIG. 4, the applicator will be moved 11 times in the direction of the axis X-X'. Of course, an applicator equipped with 11 or more nozzles will be able to cover the entire surface S in a single pass.

A first edge B1 of the surface S corresponding here to the hypotenuse and a second edge B2 opposite the first edge B1 in the direction of the axis X-X'.

Figure 5:
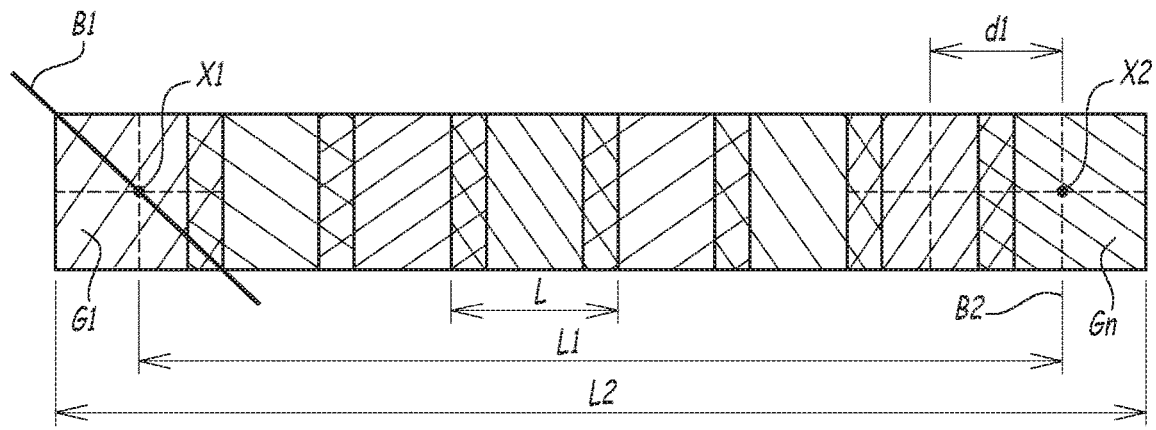
FIG. 5 is a simplified view of a series of drops deposited according to a first embodiment of the method according to the invention.

In reference to FIGS. 4 and 5, and during a subsequent step c), the nozzle 60 of the applicator robot is moved between a starting point and an arrival point, the projections of which, along the ejection axis of the nozzle, define a first reference point and a second reference point respectively belonging to (or intersecting) two edges B1 and B2 of the surface to be painted.

The ejection axis of the nozzle is the axis along which the drops are ejected from the nozzle.

Figure 8:
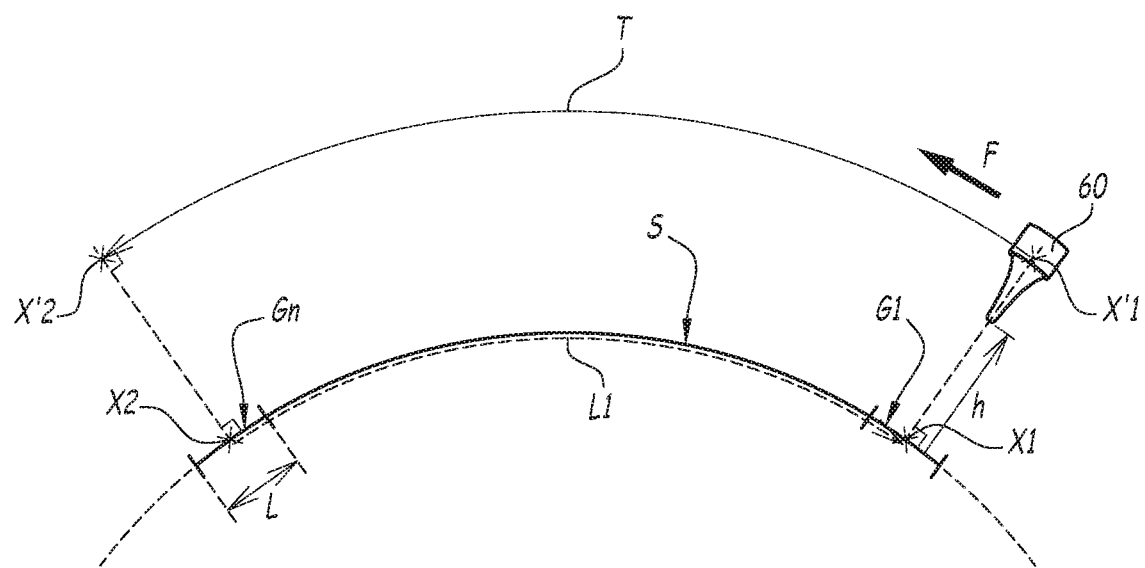
FIG. 8 is a simplified view illustrating the implementation of the method when the surface to be coated is curved, specifically domed.

Therefore, the path of the nozzle is visible in FIG. 8 only and referenced with the letter T and the movement direction of the nozzle is shown by arrow F in the figures.

Secondarily, in the example, the nozzle is oriented such that the spray axis of the nozzle remains substantially perpendicular to the surface S over all of the movement between the starting point and the arrival point. Therefore, the projections in question are in fact orthogonal projections. The starting and arrival points define, with their respective projection, that is to say, with their respective projection point, an axis normal to the surface S.

A series of drops is thus deposited between the two edges B1 and B2. This series of drops comprises n drops, referenced G1 to Gn, among which G1 designates the first series of drops, that is to say, the drop deposited first by the nozzle 60 on its path between the two edges B1 and B2, and Gn designates the last drop of the series, that is to say, the drop deposited last by the nozzle 60 on its path between the two edges B1 and B2. For the notation, Gi designates the i-th drop of the series, i being between 1 and n.

Therefore, during step c), the spacing di between the respective centers of two successive drops of the series of drops is adjusted by the controller 68 as a function of the length L1 of the journey between the two reference points and such that the last drop Gn of the series of drops is deposited in a centered manner on the second reference point. This means that, once deposited, the geometric center of the last drop is combined with the second reference point.

Reference is made to spacing rather than a distance so as to reflect that this spacing can correspond to the length of an arc.

In particular, the journey between the two reference points mentioned above has, at all points, a curve radius identical to that of the path T of the nozzle 60 between the starting point and the arrival point. In other words, the path T of the nozzle is the image of the journey between the two reference points mentioned above by a vector translation, for which the vector is a normal vector at all points of the journey and the norm of which corresponds to the distance between the nozzle 60 and the surface S, measured parallel to the ejection axis of the nozzle.

Preferably, the first drop of the series of drops is centered on the first reference point. This means that, once deposited, the geometric center of the first drop is combined with the first reference point.

In the example of FIGS. 3-7, the journey between the two reference points is straight and the length of the path therefore corresponds to the distance between the two reference points. However, in the example of FIG. 8, the journey between the two reference points is curved and the length of the journey therefore corresponds to the length of the arc between the two reference points.

Figure 3:
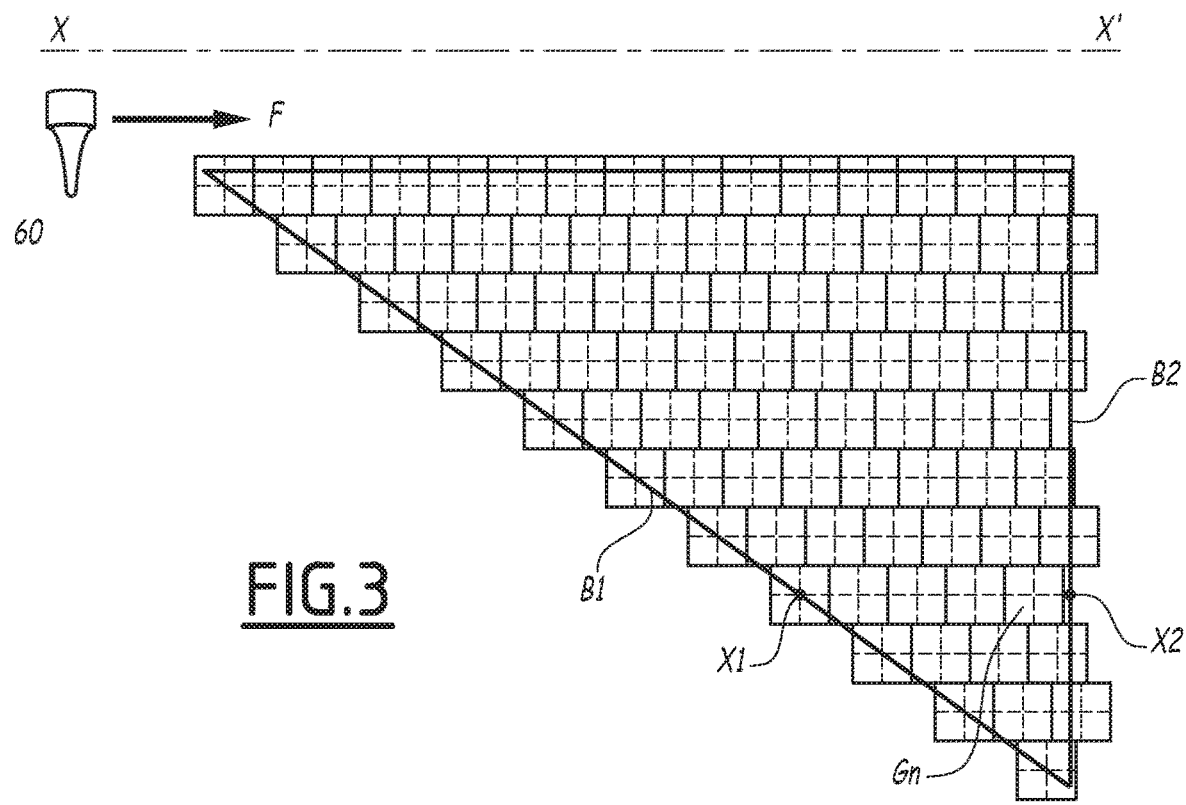
FIG. 3 is a schematic view illustrating an example of the coverage obtained, for a given surface, with a method of the prior art.

For example, and in reference to FIGS. 3 and 4, it is assumed that the applicator 6 begins by depositing the series of drops at the top and continues downward. A starting point X'1 and an arrival point X'2 are defined, the projections of which, along the axis of the nozzle, on the surface S, define two reference points X1 and X2 respectively belonging to the two edges B1 and B2 of the surface to be painted S.

In the typical case of the second series of drops (see FIG. 3), the distance between the two reference points is not a multiple of the inter-drop distance programmed by default, which in the example is equal to the width of a drop once spread. Therefore, if one considers that the drops are deposited adjacent one after the other like in the example of FIG. 3, the last drop Gn will not be able to be centered on the second reference point. Here, it is deposited well after the second reference point. As a result, the edge obtained in fine is not a clean edge, that is to say, straight, but on the contrary is very irregular. The use of a (protective) cover would not solve the problem because certain areas near the edge B2 would remain devoid of paint, as is the case for the fifth series of drops starting from the top (see FIG. 3).

Thus, the idea of the invention is, as illustrated in FIGS. 4-7, to modify the position of at least one drop of the series of drops such that the last drop in the series is deposited exactly around the second reference point. To that end, one takes into account, before depositing a series of drops, the length L1 of the series between the two reference points X1 and X2 and the size of each drop once spread, that is to say, the width L. This can be done in several ways, as outlined hereinafter.

The spacing (or the separation) di is defined as the spacing between the center of the drop Gi and the center of the drop Gi+1. This spacing is measured parallel to the curve of the path between the two reference points X1 and X2, which in practice is identical to that of the path T of the nozzle between the starting point X'1 and the endpoint X'2. In the example where the path of the nozzle 60 is a straight line, the spacing di is simply the distance between the center of the drop Gi and the center of the drop Gi+1. Thus, d1 for example designates the spacing, from center to center, between the first two drops of the series G1 and G2.

According to a first embodiment (illustrated in FIG. 5), in step c), the distance di between the respective centers of each pair of two successive drops of the series of drops is adjusted as a function of the distance L1 between the two reference points X1 and X2 such that the last drop Gn of the series of drops is deposited in a centered manner on the second reference point X2. In step c), the spacing is adjusted between the respective centers of each pair of two successive drops of the series of drops, and therefore the spacing between the respective centers of two successive drops of the series of drops is substantially the same over the entire length of the series of drops.

Advantageously, the distance di between the respective centers of two successive drops Gi and Gi+1 of the series of drops is different from, and in particular less than, the width L of a drop once spread.

For example, if the distance L1 between two reference points is equal to 35 mm, then the length L2 of the series of drops will have to be 41 mm, for a drop width L of 6 mm, given that the first and last drops (G1 and Gn) are respectively centered on the first and second reference points X1 and X2, respectively. 41 is not a multiple of 6. Therefore, eight drops will be deposited, each time with an overlap between two drops of 1 mm. Ultimately, the length L2 of the series of drops will be 8*6−7*1=48−7=41 mm, or exactly what is desired.

Figure 6:
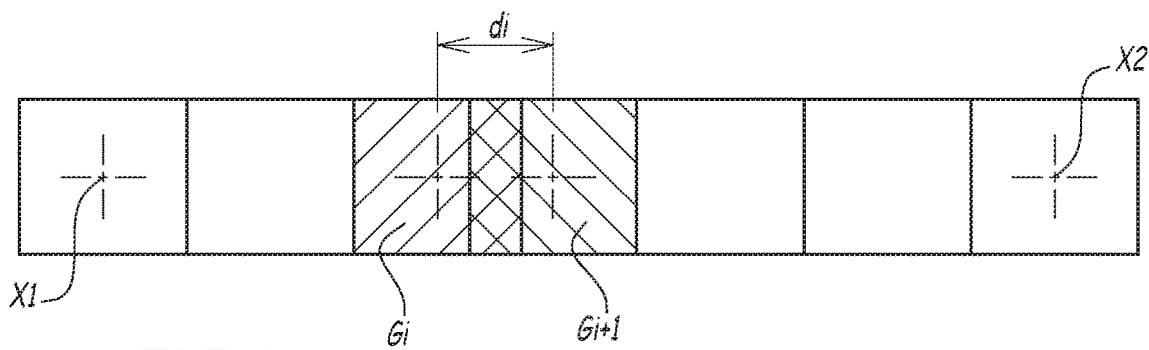
FIG. 6 is a simplified view of a series of drops deposited according to a second embodiment of the method according to the invention.

According to another embodiment, illustrated in FIG. 6, the distance is modified between only two drops, respectively Gi and Gi+1, of the series of drops (i comprised between 1 and n−1). In particular, it is possible to modify the distance d1 between the centers of the first two drops G1 and G2 or the distance dn−1 between the centers of the last two drops Gn−1 and Gn of the series. It is also possible, like in the illustration of FIG. 6, to modify the distance between two drops in the center of the series. In all three cases, the distance di between the respective centers of two successive drops Gi and Gi+1 of the series of drops is not the same over the entire length of the series of drops, that is to say, depends on the value of i. In other words, in this embodiment, at least two successive drops of the series of drops are spaced apart by a distance di, measured from center to center, equal by default to the width L of a drop once spread.

For example, if one wishes to have a series of drops with a length L2 of 40 mm, for a drop width of 6 mm, one then deposits 7 drops, two of which will overlap over a width of about 2 mm. The advantage of taking drops at a distance from the edges B1 and B2 is that there is a lower risk of running. Therefore, it can be assumed that an over-thickness at the center of the surface will be seen less than on the edges.

Figure 7:
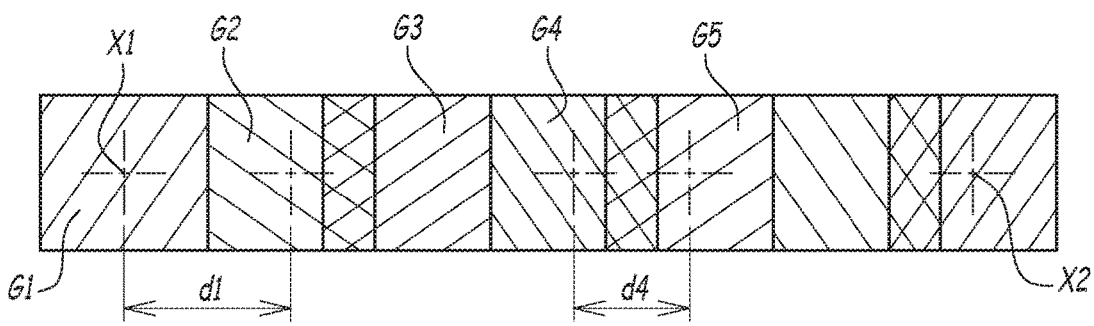
FIG. 7 is a simplified view of a series of drops deposited according to a third embodiment of the method according to the invention.

According to another embodiment, illustrated in FIG. 7, in step c), the distance between the respective centers of several pairs of two successive drops of the series of drops are adjusted. Typically, said pairs of two successive drops, for which the center to center distance is modified, are spaced apart at regular intervals from one another. In the example of FIG. 7, the center to center distance between two successive drops is modified every k drops, in particular every two drops. Specifically, in the example, the series of drops includes 7 drops. The distance, measured center to center, between drops G1 and G2, G3 and G4, G5 and G6 (d1, d3, d5) is unchanged, and therefore corresponds to the width L of a drop, which the distance (d2, d4, d6), measured from center to center, between the drops G2 and G3, G4 and G5, G6 and G7 is different, and in particular smaller.

Indeed, the controller 68 is by default programmed to deposit the drops at a predefined distance one after the other, and in particular such that the distance measured from center to center between two successive drops is equal to the width L of a drop once spread. Therefore, the controller 68 is capable of modifying (or adjusting) the distance between at least two drops of the series of drops such that the last drop Gn is deposited in a centered manner on the second point of reference X2.

Advantageously, the distance between the respective centers of the two drops is adjusted by modifying the opening frequency of the nozzle or the speed of the nozzle during its movement in step c). Indeed, for a given movement speed, it is possible to modify the opening frequency of the nozzle, over all or part of the series of drops, such that the last drop is centered on the second point of reference. Conversely, for a certain opening frequency of the nozzle, it is possible to modify the movement speed of the applicator 6, over all or part of the series of drops, such that the last drop Gn is centered on the second reference point X2.

Preferably, the controller of the robot is therefore capable of modifying the movement speed of the applicator 6, and therefore that of the nozzle(s), as a function of the frequency, which is fixed, for opening of the nozzle(s) and/or of modifying the opening frequency of the nozzle(s) as a function of the movement speed of the nozzle, so as to adapt the length of the series of drops as a function of the length L1 of the journey between the two reference points, and therefore of depositing the last drop Gn of the series of drops in a centered manner on the second reference point X2.

FIG. 8 shows an embodiment variant in which the surface S to be coated is curved, and in particular domed. In this embodiment, the length of the journey L1 between the two reference points X1 and X2 is the length of an arc. Therefore, the path T of the nozzle is curved in the same way, that is to say, the curve radius is the same. Additionally, the spacing di also corresponds to the length of the arc between the center of the drops Gi and Gi+1.

Figure 9:
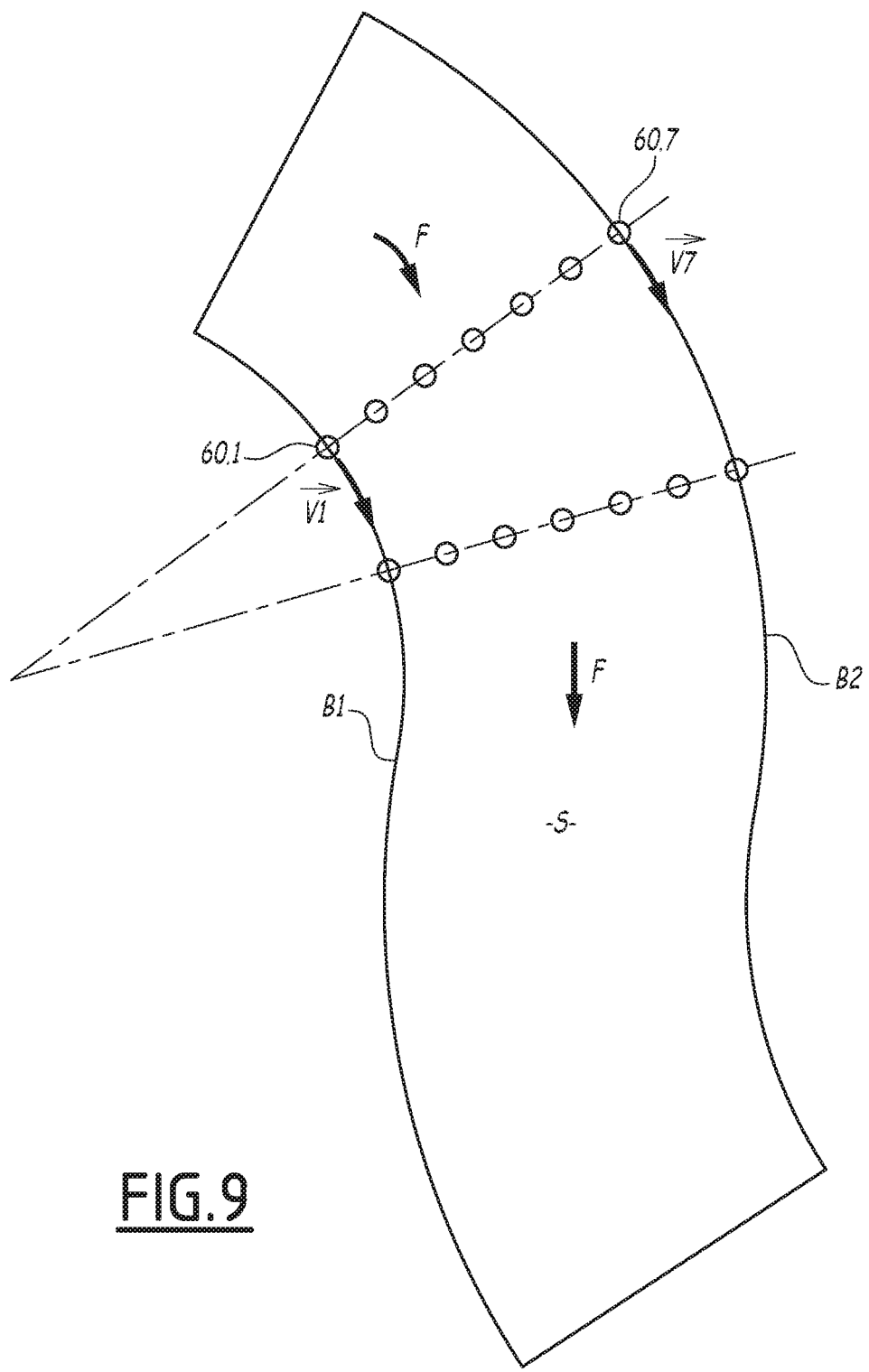
FIG. 9 is a simplified elevation view illustrating the implementation of the method when the surface to be coated is warped.

FIG. 9 shows an embodiment variant in which the surface S to be coated is warped, and requires the robot to follow a three-dimensional path, that is to say, not only in a plane. For example, if the nozzles follow a contour (like in FR 3,048, 368 A1), each nozzle will have a different journey length. In the case of a rotation around the tool axis, the nozzle that is on the inside of the "turn" will follow a shorter path than that of the nozzle located on the outside of the turn (or the curve).

Typically, in the example of FIG. 9, the applicator robot comprises several nozzles that are referenced 60.1-60.7 and that are aligned along an axis perpendicular to the direction F of movement of the robot. On the first part of the path, the nozzle 60.1 is on the inside of the turn, while the nozzle 60.7 is on the outside of the turn. Therefore, the actual speed v1 of the nozzle 60.1 is lower than the actual speed v7 of the nozzle 60.7. As a result, and if it is considered that the application of the coating product is done according to the first embodiment, where the inter-drop distance is identical over the entire length of the series of drops, the ejection frequency of the drops will be different for each of the nozzles of the robot, which is logical, since the length of the path between the two reference points is different in each case. In practice, the ejection frequency of the drops therefore depends on the actual speed of the nozzle, and therefore indirectly on the position of the nozzle relative to the path of the robot.

The features and variants and the various embodiments of the method may be combined so as to create new embodiments of the method.

The invention claimed is:

1. A method for applying a coating product using drop on demand technology, in which the coating product is deposited by an applicator robot comprising a controller and at least one nozzle, each of the at least one nozzle being able to open and close repeatedly, the at least one nozzle being commanded by the controller, the method comprising:
    calculating coordinates of several points located on the contour of a surface to be coated;
    sending the coordinates calculated by said calculating to the controller of the robot;
    moving at least one nozzle of the at least one nozzle of the robot applicator between a respective starting point and a respective arrival point, projections of which, along an ejection axis of the at least one moving nozzle, on the surface to be coated, respectively define a first reference point and a second reference point respectively belonging to two edges of the surface to be coated, in order to deposit a series of drops between the two edges; and
    adjusting center-to-center distance only between each $k^{th}$ successive pair of drops of the series of drops, where k is a fixed positive integer at least two, by the controller as a function of the length of a journey between the first reference point and the second reference point and such that the last drop of the series of drops is deposited in a centered manner on the second reference point, and wherein the center of a drop is the point of deposit of the coating product for the drop by the applicator robot.

2. The method according to claim 1, further comprising programming the controller to deposit the drops such that the center-to-center distance between any two successive drops is less than or equal to the width of a drop once spread.

3. The method according to claim 1, wherein said adjusting comprises modifying an opening frequency of the nozzle depositing the drops during said moving or the speed of the nozzle depositing the drops during said moving.

4. The method according to claim 3, wherein said modifying comprises modifying the opening frequency of the nozzle depositing the drops in real time based on the speed of the nozzle and/or the position of the nozzle.

5. The method according to claim 1, further comprising centering the first drop of the series of drops on the first reference point.

6. The method according to claim 1, further comprising commanding opening and closing of each nozzle electronically by solenoid valves.

7. The method according to claim 1, further comprising commanding opening and closing of each nozzle electronically by piezoelectric actuators.

8. The method according to claim 1, wherein the robot comprises several nozzles, the method further comprising commanding opening and closing each nozzle electronically, independently for each nozzle, such that each nozzle has a different ejection frequency.

9. The method according to claim 1, wherein the journey between the two reference points has, at all points, a curve radius identical to that of a path of the corresponding nozzle between the starting point and the arrival point.

10. The method according to claim 1, further comprising orienting each nozzle such that the ejection axis of the nozzle remains substantially perpendicular to the surface to be coated over all of the movement between the starting point and the arrival point.

* * * * *